United States Patent
Mahvi

[11] Patent Number: 5,863,049
[45] Date of Patent: Jan. 26, 1999

[54] RETRACTABLE AND EXTENDABLE WHEEL ASSEMBLY

[76] Inventor: A. Pascal Mahvi, 8585 Sunview Dr., Broadview Heights, Ohio 44147

[21] Appl. No.: 816,415

[22] Filed: Mar. 13, 1997

[51] Int. Cl.[6] ................................................. B60S 9/00
[52] U.S. Cl. ................................ 280/6.152; 280/6.151; 280/414.5; 280/43
[58] Field of Search ................ 280/6.152, 6.151, 280/414.5, 424, 423.1, 43.11, 43, 43.17, 124.57; 140/41

[56] References Cited

U.S. PATENT DOCUMENTS

| | | | |
|---|---|---|---|
| 2,443,433 | 6/1948 | Sanmori | 280/6.152 |
| 2,788,908 | 4/1957 | Lynd | 280/414.5 |
| 2,988,376 | 6/1961 | Chausson | 280/6.152 |
| 3,199,890 | 8/1965 | Caldwell | 280/43.23 |
| 3,972,544 | 8/1976 | Soot | 280/704 |
| 4,248,455 | 2/1981 | Manning | 280/6.152 |
| 4,374,592 | 2/1983 | Geary et al. | 280/476 R |
| 4,453,737 | 6/1984 | Burchard et al. | 280/124.116 |
| 4,842,302 | 6/1989 | Lauronen et al. | 280/704 |
| 4,850,786 | 7/1989 | Oswald et al. | 414/460 |
| 4,886,290 | 12/1989 | Pourchon et al. | 280/704 |
| 4,900,055 | 2/1990 | Wright | 280/704 |
| 5,058,916 | 10/1991 | Hicks | 280/704 |
| 5,090,495 | 2/1992 | Christenson | 180/24.02 |
| 5,340,141 | 8/1994 | Thoradyke | 280/423.1 |
| 5,476,274 | 12/1995 | Oberlander | 280/43.17 X |
| 5,560,639 | 10/1996 | Nowell et al. | 280/43.11 X |

*Primary Examiner*—Christopher P. Ellis
*Attorney, Agent, or Firm*—Stetina Brunda Garred & Brucker

[57] ABSTRACT

A retractable and extendable wheel assembly for mounting to a vehicle at wheel positions of the vehicle. The assembly comprises an axle shaft on which a wheel having a central axis can rotate, and a strut having a first end pivotally mounted at a first strut mount site to the axle shaft and a second end pivotally mountable at a second strut mount site to the vehicle. Additionally, the assembly includes an inflatable and deflatable air ram having a first end pivotally mounted to the first end of the strut and a second end pivotally mountable to the vehicle at an upper ram mount site substantially directly above the axle shaft. The second strut mount site is situated forward or rearward from the upper ram mount site. Release of air from an inflated air ram results in a retraction of the ram and the vehicle descends. Simultaneously, the strut pivots to thereby allow the vehicle to descend preferably a distance sufficient to bring the base of the vehicle at a level substantially equal to the center axis of the wheel. Inflation of the air rams restores the vehicle to its original height for road travel. Thus, cargo can be safely loaded and unloaded since ramps or other devices for vertically raising or lowering such cargo can be eliminated.

12 Claims, 2 Drawing Sheets

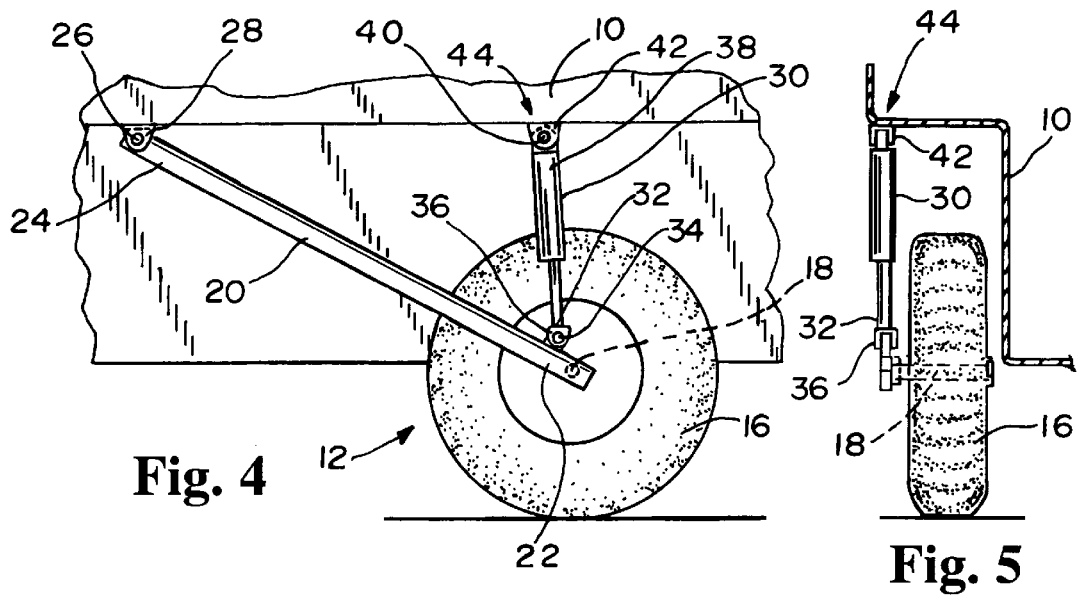
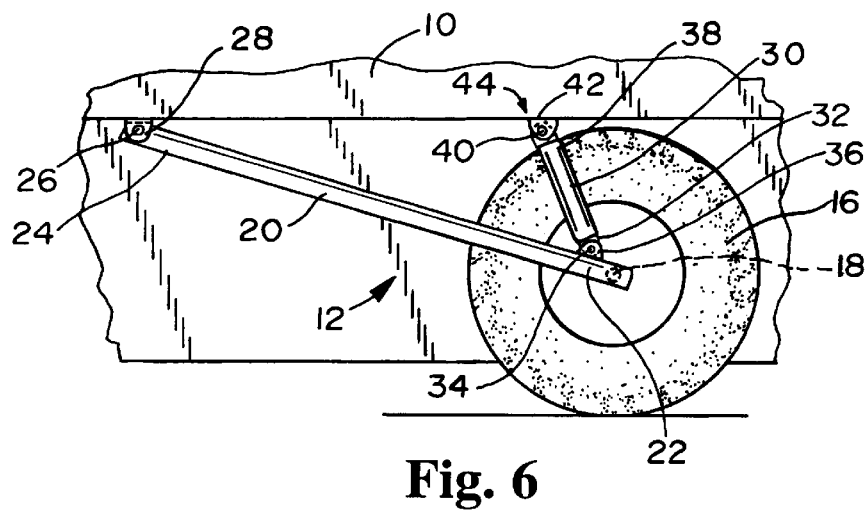

RETRACTABLE AND EXTENDABLE WHEEL ASSEMBLY

FIELD OF THE INVENTION

This invention relates in general to vehicle wheel assemblies, and in particular to a retractable and extendable wheel assembly wherein an air ram and a strut are cooperatively mounted to an axle shaft such that deflation of the air ram brings the vehicle closer to the ground for convenient loading of cargo such as live animals for example, and such that inflation of the air ram raises the vehicle a sufficient vertical distance from the ground to permit the vehicle to travel in a conventional manner.

BACKGROUND OF THE INVENTION

Over-the-road vehicles such as tractor-trailer combination vehicles are used in moving significant amounts of freight from site to site, whether over long distances or short distances. This freight includes manufactured goods, food items, live animals, etc., with most freight collectively being of heavy weight and therefore requiring tedious work in its loading and unloading to and from a transporting trailer.

One particular area where loading and unloading presents vulnerability to cargo involves the transporting of livestock, and particularly horses. Specifically, and as opposed to being freight that can be hand carried, live animals must propel themselves into and out of the shipment trailer. Consequently, specialized attendants must be present to guide the animals along temporary ramps leading from the ground to the trailer. If an animal should lose its footing and fall from such a ramp, fractured bones and possible animal loss is possible.

In view of the inconvenience and potential accidents associated with the required use of ramps in the loading of shipment trailers, it is apparent that a need is present for safer, more direct access to the trailers. Accordingly, a primary object of the present invention is to provide a retractable and extendable wheel assembly for mounting to a vehicle such that the vehicle can be lowered for loading and unloading.

Another object of the present invention is to provide such a retractable and extendable wheel assembly wherein expandability and retractability is accomplished through inflation and deflation of an air ram integral with the wheel assembly.

Yet another object of the present invention is to provide such a retractable and extendable wheel assembly wherein a pivotally mounted support strut operates in cooperation with the air ram to support the wheel in place and guide its vertical movement during inflation and deflation of the air ram.

These and other objects of the present invention will become apparent throughout the description thereof which now follows.

SUMMARY OF THE INVENTION

The present invention is a retractable and extendable wheel assembly for mounting to a vehicle at wheel positions of the vehicle. The assembly comprises an axle shaft on which a wheel having a central axis can rotate, and a strut having a first end pivotally mounted at a first strut mount site to the axle shaft and a second end pivotally mountable at a second strut mount site to the vehicle. Additionally, the assembly includes an inflatable and deflatable air ram having a first end pivotally mounted to the first end of the strut and a second end pivotally mountable to the vehicle at an upper ram mount site substantially directly above the axle shaft. The second strut mount site is situated forward or rearward from the upper ram mount site. The air ram is sufficiently inflatable to position a vehicle to which the assembly is mounted at an adequate vertical distance above a support surface to permit wheel travel of the vehicle thereon, and sufficiently deflatable to position the vehicle at a vertical distance above said support surface which is less than the vertical distance for travel and which is convenient for loading and unloading cargo.

The present invention also includes a vehicle, and especially a trailer vehicle, having such a retractable and extendable wheel assembly at each wheel position. The second strut mount site is preferably situated forward from the upper ram mount site a sufficient distance to form an angle of from about 45 and about 75 degrees between the air ram and the strut when the air ram is fully inflated. Release of air from an inflated air ram results in a retraction of the ram caused by the weight of the vehicle as it forces the air out of the ram and the vehicle descends. Simultaneously, the strut and air ram pivot to thereby allow the vehicle to descend preferably a distance sufficient to bring the base of the vehicle at a level substantially equal to the center axis of the wheel. By so doing, the floor of the vehicle is significantly lower than its original height, and entry therein is substantially only a step above ground level. As a result, loading and unloading the vehicle is easily accomplished. The vehicle can be equipped with one or more on-board air pumps to inflate the air rams. Once the air rams are inflated, the wheel assembly returns to its original configuration with the vehicle at its original height for road travel. In this manner, cargo can be safely loaded and unloaded since ramps or other devices for vertically raising or lowering such cargo can be eliminated. Instead, loading is usually accomplished by taking a single vertical step from or to the interior of the vehicle.

BRIEF DESCRIPTION OF THE DRAWINGS

An illustrative and presently preferred embodiment of the invention is shown in the accompanying drawings in which:

FIG. 4 is a side elevation view of the extended wheel assembly of FIG. 3;

FIG. 5 is an end elevation view of the extended wheel assembly of FIG. 4; and

FIG. 6 is a side elevation view of one wheel assembly in a retracted configuration.

DETAILED DESCRIPTION OF THE PREFERRED EMBODIMENT

Figure 1:
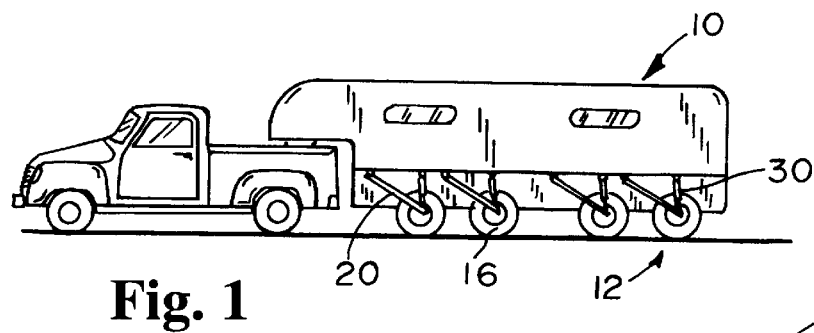
FIG. 1 is a side elevation view of a trailer having a plurality of retractable and extendable wheel assemblies in the expanded configuration.
Figure 2:
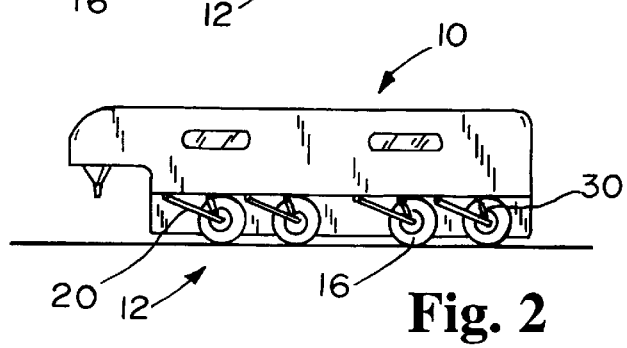
FIG. 2 is a side elevation view of the trailer of FIG. 1 except with the wheel assemblies in the retracted configuration.

Referring to FIGS. 1 and 2, a horse trailer 10 is shown with a retractable and extendable wheel assembly 12 at each wheel position, with each assembly 12 having attached thereto a wheel-and-tire unit 16. Each wheel assembly 12 in FIG. 1 is in an expanded configuration, resulting in the trailer 10 being in a travel configuration for movement over a highway or other route. Conversely, each wheel assembly 12 in FIG. 2 is in a retracted configuration, resulting in the trailer 10 being near the ground to thereby provide loading and unloading thereof via a single step from the ground to the trailer interior.

Figure 3:
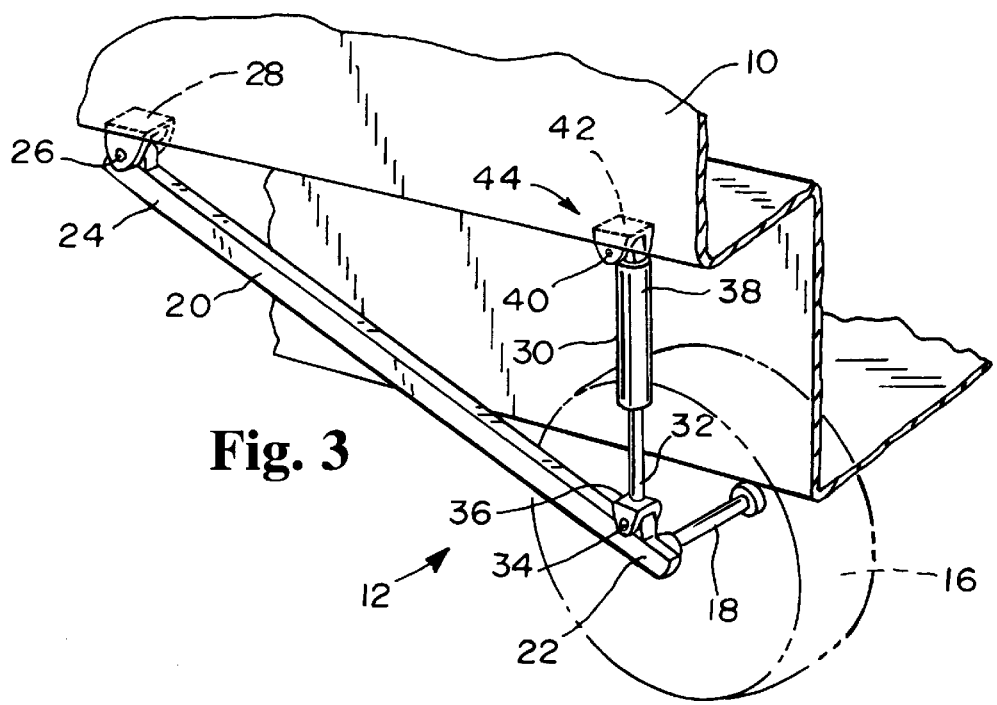
FIG. 3 is a perspective view of one wheel assembly in an extended configuration.

FIGS. 3–5 show a wheel assembly 12 in an expanded configuration, while FIG. 6 shows the same assembly 12 in a retracted configuration. In particular, the wheel assembly 12 includes an axle shaft 18 to which a wheel-and-tire unit 16 is mountable. A strut 20 extends from the trailer 10 to the axle shaft 18, and is pivotally mounted at each end. Specifically, the first end 22 of the strut 20 is pivotally mounted to the axle shaft 18, while the second end 24 thereof is pivotally mounted to a pin 26 within a bracket 28 attached to the trailer 10. An inflatable and deflatable air ram 30 extends from the trailer 10 to the first end 22 of the strut 20, and is pivotally mounted at each end. In particular, the first end 32 of the air ram 30 is pivotally mounted to a pin 34 within a bracket 36 attached to the first end 22 of the strut 20, while the second end 38 of the air ram 30 is mounted to a pin 40 within a bracket 42 at an upper ram mount site 44 situated substantially directly above the axle shaft 18. As is apparent, the pin 34 is forward of the upper ram mount site 44 such that an angle of from about 45 to about 75 degrees is formed between the strut 20 and the air ram 30 when the air ram 30 is in an extended configuration.

In operation, each wheel assembly 12 is in the extended configuration as illustrated in FIGS. 1, 3, 4 and 5 to thereby permit conventional travel of the trailer as over a highway or other road surface. Conversely, when the trailer is to be loaded or unloaded, air is released from the inflated air ram of each assembly 12 to thereby cause retraction of the ram aided by the weight of the trailer 10. Simultaneously, both the strut 20 and air ram 30 pivot at each respective end thereof and the trailer 10 descends as illustrated in FIGS. 2 and 6, thereby permitting single upward and downward steps in loading and unloading without use of a loading ramp. After loading and/or unloading is completed, the air rams 30 are inflated as with a conventional air pump (not shown) that can be provided as permanent equipment for the trailer 10, and conventional travel can occur.

While an illustrative and presently preferred embodiment of the invention has been described in detail herein, it is to be understood that the inventive concepts may be otherwise variously embodied and employed and that the appended claims are intended to be construed to include such variations except insofar as limited by the prior art.

What is claimed is:

1. A retractable and extendable wheel assembly for mounting to a vehicle at a wheel position of said vehicle, said wheel assembly comprising:
    a) an axle shaft on which a wheel having a central axis can rotate at said central axis;
    b) a strut having a first end pivotally mounted at a first strut mount site to the axle shaft and a second end pivotally mountable at a second strut mount site to the vehicle; and
    c) an inflatable and deflatable air ram having a first end pivotally mounted to the first end of the strut and a second end pivotally mountable to the vehicle at an upper ram mount site substantially directly above the axle shaft, and wherein said second strut mount site is situated forward or rearward from the upper ram mount site.

2. A wheel assembly as claimed in claim 1 wherein the air ram is sufficiently inflatable to position a vehicle to which the assembly is mounted at an adequate vertical distance above a support surface to permit wheel travel of the vehicle thereon, and sufficiently deflatable to position the vehicle at a vertical distance above said support surface which is less than the vertical distance for travel.

3. A wheel assembly as claimed in claim 2 wherein said second strut mount site is situated forward from the upper ram mount site.

4. A wheel assembly as claimed in claim 3 wherein said second strut mount site is situated a sufficient distance from the upper ram mount site to form an angle of from about 45 to about 75 degrees between the air ram and the strut when the air ram is fully inflated.

5. A vehicle having a retractable and extendable wheel assembly at each wheel position, wherein the wheel assembly comprises:
    a) an axle shaft on which a wheel having a central axis can rotate at said central axis;
    b) a strut having a first end pivotally mounted at a first strut mount site to the axle shaft and a second end pivotally mounted at a second strut mount site to a pin disposed on the vehicle; and
    c) an inflatable and deflatable air ram having a first end pivotally mounted to the first end of the strut and a second end pivotally mounted to the vehicle at an upper ram mount site substantially directly above the axle shaft, and wherein said pin is situated forward or rearward from the upper ram mount site.

6. A vehicle as claimed in claim 5 wherein the air ram of the wheel assembly is sufficiently inflatable to position the vehicle at an adequate vertical distance above a support surface to permit wheel travel of the vehicle thereon, and sufficiently deflatable to position the vehicle at a vertical distance above said support surface which is less than the vertical distance for travel.

7. A vehicle as claimed in claim 6 wherein the pin of the wheel assembly is situated forward from the upper ram mount site.

8. A vehicle as claimed in claim 7 wherein the pin of the wheel assembly is situated a sufficient distance from the upper ram mount site to form an angle of from about 45 and about 75 degrees between the air ram and the strut when the air ram is fully inflated.

9. A trailer vehicle towable by a truck and detachable therefrom, said trailer vehicle having at each wheel position thereof a retractable and extendable wheel assembly comprising:
    a) an axle shaft on which a wheel having a central axis can rotate at said central axis;
    b) a strut having a first end pivotally mounted at a first strut mount site to the axle shaft and a second end pivotally mounted at a second strut mount site to a pin disposed on the vehicle; and
    c) an inflatable and deflatable air ram having a first end pivotally mounted to the first end of the strut and a second end pivotally mounted to the vehicle at an upper ram mount site substantially directly above the axle shaft, and wherein said pin is situated forward or rearward from the upper ram mount site.

10. A trailer vehicle as claimed in claim 9 wherein the air ram of the wheel assembly is sufficiently inflatable to position the vehicle at an adequate vertical distance above a support surface to permit wheel travel of the vehicle thereon, and sufficiently deflatable to position the vehicle at a vertical distance above said support surface which is less than the vertical distance for travel.

11. A trailer vehicle as claimed in claim 10 wherein the pin of the wheel assembly is situated forward from the upper ram mount site.

12. A trailer vehicle as claimed in claim 11 wherein the pin of the wheel assembly is situated a sufficient distance from the upper ram mount site to form an angle of from about 45 and about 75 degrees between the air ram and the strut when the air ram is fully inflated.

* * * * *